(12) United States Patent
Finkenwirth et al.

(10) Patent No.: US 7,422,818 B2
(45) Date of Patent: Sep. 9, 2008

(54) SEAL CONSTRUCTION FOR A FUEL CELL ELECTROLYSER AND PROCESS FOR MAKING A FUEL CELL WITH SAME

(75) Inventors: Olav Finkenwirth, Munich (DE); Bernd Kuhn, Leinfelden (DE); Hans-Rainer Zerfass, Taunusstein (DE)

(73) Assignees: Bayerische Motoren Werke AG, Munich (DE); ElringKlinger AG, Dettingen (DE)

( * ) Notice: Subject to any disclaimer, the term of this patent is extended or adjusted under 35 U.S.C. 154(b) by 0 days.

(21) Appl. No.: 11/085,042

(22) Filed: Mar. 22, 2005

(65) Prior Publication Data
US 2005/0186463 A1 Aug. 25, 2005

Related U.S. Application Data

(63) Continuation of application No. 10/760,666, filed on Jan. 21, 2004.

(30) Foreign Application Priority Data
Jan. 21, 2003 (DE) .................................. 103 021 24

(51) Int. Cl.
H01M 2/08 (2006.01)
(52) U.S. Cl. .............................. 429/35; 429/34; 429/30; 427/115
(58) Field of Classification Search .................. 429/35, 429/34, 30; 427/115
See application file for complete search history.

(56) References Cited

U.S. PATENT DOCUMENTS

2004/0209147 A1* 10/2004 Finkenwirth et al. .......... 429/35
2004/0219417 A1* 11/2004 Finkenwirth et al. .......... 429/35

FOREIGN PATENT DOCUMENTS

| DE | 195 15 457 C1 | 7/1996 |
| DE | 19650903 A1 | 6/1998 |
| DE | 19960516 A1 | 7/2000 |
| JP | 64-3966 | 1/1989 |
| JP | 02007372 A | 1/1990 |
| JP | 2-209689 | 8/1990 |
| JP | 6-260192 | 9/1994 |
| JP | 10-92450 | 4/1998 |
| WO | WO/96/17394 | 6/1996 |
| WO | WO 99/54131 | * 4/1998 |

OTHER PUBLICATIONS

German Office Action dated Jul. 9, 2003.

* cited by examiner

*Primary Examiner*—Laura S Weiner
(74) *Attorney, Agent, or Firm*—Crowell & Moring LLP

(57) ABSTRACT

A sealing structure in a fuel cell and/or an electrolyzer (particularly a solid-oxide fuel cell and/or a solid-oxide electrolyzer) is arranged between neighboring separator plates of a cell stack. The sealing structure is constructed in at least two layers, including at least one insulating layer and at least one sealing layer.

57 Claims, 2 Drawing Sheets

SEAL CONSTRUCTION FOR A FUEL CELL ELECTROLYSER AND PROCESS FOR MAKING A FUEL CELL WITH SAME

This is a Continuation of application Ser. No. 10/760,666 and claims the priority of German Patent document DE 103 021 24.8, filed Jan. 21, 2004.

FIELD OF THE INVENTION

This invention relates to a sealing structure for a fuel cell or an electrolyzer, to a method of producing the sealing structure, and to a fuel cell or an electrolyzer.

BACKGROUND OF THE INVENTION

A conventional fuel cell stack 1, shown in FIG. 3, has two or more individual fuel cells 2 which are stacked above one another in the manner of a tower. Each fuel cell 2 has an electrolyte layer 3, a cathode layer 4 arranged on one flat side of the electrolyte layer 3, and an anode layer 5 arranged on the other flat side of the electrolyte layer 3. For contacting a neighboring fuel cell 2, a contacting layer 6 is disposed on the cathode layer 4.

In addition, each individual fuel cell 2 has first and second separator plates 7, 8 that bound a combustible-gas space 9, into which the anode layer 5 projects. The combustible-gas space 9 is connected with the anode layer 5 such that combustible gas, which flows through the combustible-gas space 9 (direction of the arrow 10), can come in contact with the free surface of the anode layer 5.

Between the second separator plate 8 of one fuel cell 2 and a first separator plate 7 of the neighboring fuel cell 2, an oxidation gas space 11 is constructed, through which oxidation gas can flow (direction of the arrow 12), so that oxidation gas can flow against the free surface of the cathode layer 4, which projects into the oxidation gas space 11.

One flat side of the contacting layer 6 is in contact with the cathode layer 4 while the other flat side contacts a flat side of a first separator plate 7 of the neighboring individual fuel cell 2 (the latter facing the oxidation gas space 11). By way of corresponding openings 13 in the first and second separator plates 7 and 8, all combustible-gas spaces 9 are connected with one another. In the area between a second separator plate 8 and a first separator plate 7 of a neighboring individual fuel cell 2, the combustible-gas spaces 9 are separated in a gastight manner from the oxidation gas space 11 by means of a sealing layer 14, so that a fuel feeding duct 15 and a removal duct 16 for the reaction products are formed. Thus, combustible gas can be fed to the combustible-gas spaces 9 in the direction of the arrow 18 and flows through these in the direction of the arrow 10. In this case, the combustible gas is oxidized in a fuel cell 2 along the anode layer 5, and the reaction product can leave the fuel cell stack 1 again in the direction of the arrow 19. By way of correspondingly constructed feeding and removal ducts, the oxidation gas, analogous to the combustible gas, is guided through the oxidation gas spaces 11.

The separator plates 7 and 8 of an above-described fuel cell stack 1 therefore, on the one hand, have the function of electrically connecting the individual fuel cells 2, which are disposed in series. On the other hand, they ensure the separation of combustible and oxidation gas. For this purpose, the separator plates 7 and 8 (also called bipolar plates or interconnector plates) are constructed of a combustible-gas-tight, oxidation-gas-tight and electronically conductive material, such as a chrome-containing alloy, ferritic steel or perovskite.

In order to ensure a reliable separation of the oxidation gases and the combustible gases, it is required that, in each case, between the second separator plate 8 of a first fuel cell 2 and the first separator plate 7 of a neighboring fuel cell 2, the feeding duct 15 as well as the product removal duct 16 be reliably sealed off from the oxidation gas space 11.

It is known from the state of the art to construct the sealing layer 14, for example, of glass-ceramic solders, which are normally applied as pastes or etched foils before the assembling of a fuel cell stack 1 onto the relevant sealing surfaces of the separator plates 7, 8.

These sealing materials (glass-ceramic solders) normally used in the case of solid-electrolyte fuel cells have two characteristics influencing one another in opposite directions. The coefficient of thermal expansion of the sealing material is clearly lower in comparison to the coefficients of expansion of most materials used for the bipolar plates 7 and 8. During the rapid heating of the fuel cell stack 1, this may result in thermally induced tension cracks in the sealing layer 14 and thus in a failure of its sealing effect. This is particularly critical in the case of solid-electrolyte fuel cells (the so-called SOFC's—solid oxide fuel cells) which operate in the high-temperature range. Particularly for solid-electrolyte fuel cells, which are stressed by a frequent starting and switching-off of the operation, this represents a problem which has not been satisfactorily solved.

From the state of the art, it is conventional to increase the coefficient of expansion of the sealing materials by means of additions. However, these additions frequently lead to a reduction of the electric resistance of the sealing material at the typically high operating temperatures of a solid-electrolyte fuel cell. By way of the sealing layer 14 between a second separator plate 8 and a first separator plate 7 of two neighboring individual fuel cells 2, this results in undesirable leak currents which impair the electric efficiency of a fuel cell stack 1.

Another disadvantage of the sealing device known according to FIG. 3 of the state of the art is that the materials for the sealing layer 14 have a compression behavior and/or shrinking behavior which differs in comparison to the contacting layer 6, whereby, during the mounting of the fuel cell stack 1, undesirable inaccuracies occur which may make a reliable contacting between the contacting layer 6 and an adjoining separator plate 7 doubtful. Furthermore, it is disadvantageous that the providing of a suitable sealing layer 14 before the assembling of the fuel cell stack 1 requires high expenditures and cost because, for example, a sealing agent strand has to be established or, in the case of a foil-type construction of the sealing layer 14, the latter has to be produced separately and has to be positioned or inserted before the assembling process.

The above-mentioned glass-ceramic solders have two serious disadvantages:

1. The coefficient of thermal expansion of glass ceramics is clearly lower in comparison to the coefficients of expansion of most materials (chrome alloys, ferritic steel, perovskite) used for the bipolar plates. During the rapid heating of the fuel cell stack, this may result in thermally induced tension cracks in the sealings and thus in a failure of the sealing effect. This is particularly critical in the case of a mobile use of the fuel cell stack, for example, in an auxiliary energy supply unit in an automobile.

2. Glass-ceramic solders shrink during the joining process, that is, during the pressing-together and the first heating to the operating temperature of 750-900° C., to approximately 40%-70% of their initial volume. The entire stack therefore sinks together during the joining process. In order to ensure the tightness of the stack, the porous electric contacting layer 6 of the fuel cell (see FIG. 3) also has to shrink by the same thickness. The difficulty now consists of coordinating the shrinkage behavior of the sealing layer and of the contacting layer. The pasty ceramic suspensions normally used for the electric contacting shrink even at low temperatures and compact at temperatures higher than 400° C. In the case of glass-ceramic solders, the shrinking process starts only at temperatures >500° C. and is concluded only at temperatures >750° C. The two processes therefore do not take place simultaneously and frequently result in gas leakages, lack of electric contacting or a fracture of the SOFC (solid oxide fuel cell) because of locally excessive contact pressure forces.

Based on the above-mentioned disadvantages of the glass-ceramic solders, the development of an alternative inorganic sealing mass was carried out. With respect to its coefficient of expansion, it is better adapted to the used bipolar plate materials and has only minimal shrinkage during the joining process, so that the necessity of using electric contacting materials especially adapted in their shrinkage behavior is eliminated. However, the disadvantage of this sealing paste is an electric insulating capacity which is insufficient at the operating temperature. When solid-electrolyte fuel cell stacks are used, this results in electric leak currents (short circuits) between the individual bipolar plates and thus results in power losses in the system.

German Patent Document DE 19515457 C1 describes a sealing structure for a fuel cell. The fuel cell has an electrolyte layer that consists of an electrolyte matrix saturated with an electrolyte and, in the sealing area, the electrolyte matrix is constructed to be extended beyond the electrodes. In the sealing area, the electrolyte matrix is saturated by means of a material chemically related to the electrolyte, which material is firm at the working temperature of the fuel cell. However, the suggested solution relates to a so-called molten-carbonate fuel cell which has a molten electrolyte which is present in liquid form in an electrolyte matrix. In the case of this type of fuel cell, one usually speaks of a wet-sealing area because the electrolyte which is molten in its operating condition, forms a wet area in the edge region which is to be sealed off. However, this solution cannot be transferred to a solid-electrolyte fuel cell since, in the case of such a solid-electrolyte fuel cell (SOFC: solid-oxide fuel cell), no so-called wet electrodes or wet electrolytes exist, and thus the problem on which German Patent Document DE 19515457 C1 is based does not occur as a result of the type of construction.

German Patent Document DE 19960516 A1 describes a sealing device for a fuel cell. The fuel cell has an electrolyte membrane that is extended into the edge sealing area between two separator plates and a two-layer rubber seal that is arranged on the electrolyte membrane. For the sealing structure, it is suggested that one layer be constructed of a soft sponge rubber and the second layer be constructed of a harder rubber, such as silicone rubber or butyl rubber. This document relates to a so-called low-temperature fuel cell with a polymer membrane electrolyte. These so-called low-temperature fuel cells have operating temperatures which are in the range of between 60° C. and 80° C. Because of their operating temperatures, such fuel cells cannot be compared with a solid-electrolyte fuel cell because normally solid-electrolyte fuel cells are operated in temperatures range of between 700 and 1,100° C. Because of the high operating temperatures of a solid-electrolyte fuel cell, the sealing device suggested in German Patent Document DE 19960516 A1 can therefore not be transferred to a solid-electrolyte fuel cell.

Japanese Patent Document JP 10092450 shows a fuel cell stack with insulating layers and sealing layers, arranged in layers and formed as separate components.

SUMMARY OF THE INVENTION

It is an object of the invention to provide a sealing structure for a fuel cell or an electrolyzer, particularly a solid-electrolyte fuel cell, which is insensitive to thermo-mechanical tensions and simultaneously ensures an electric (particularly an electronic) insulation; that is, an impermeability for electrons. Furthermore, the sealing structure according to the invention is to be producible in a simple and cost-effective manner, particularly in comparison to the state of the art, without additional working steps. In addition, the compressibility and/or the shrinkage characteristic of the sealing structure is to be adapted to that of the contacting layer and thus provide a facilitated and particularly more process-secure mounting.

This and other objects and advantages are achieved by a sealing structure in a fuel cell or electrolyzer according to the invention. In an embodiment, the sealing structure according to the invention is arranged between neighboring separator plates of a cell stack, the sealing structure being constructed in at least two layers and having at least one insulating layer and at least one sealing layer, and wherein the insulating layer is arranged on a carrier element. Additional objects and advantages are achieved by a method of producing a sealing structure for a fuel cell or an electrolyzer according to the invention. In an embodiment, the method comprises:

producing at least one insulating layer on a carrier element; and producing at least one sealing layer made of a sealing material, the sealing structure being arranged in a sealing area of a fuel cell stack.

Still other objects and advantages are achieved by a fuel cell or electrolyzer according to the invention that comprises a sealing structure as described above. Further advantageous embodiments of the invention are indicated in the specification and claims below.

In one embodiment of the invention, in order to counter the lack of electric insulation capacity of certain sealing materials, an outer skin made of aluminum oxide ($Al_2O_3$) in a γ-modification is produced by means of a targeted oxidation process, either on the sealing surfaces of the bipolar plates themselves or on insulation plates additionally inserted between the sealing surfaces of the bipolar plates. γ-$Al_2O_3$ has a very high electric resistance and an excellent corrosion stability in oxidizing as well as in reducing media. In another embodiment, additional insulation elements can be used when the use of γ-$Al_2O_3$-forming steel types as a bipolar material is not desirable, for example, because of the restriction on the electric current conduction between the bipolar plate and the cells.

In an embodiment, the outer skin of aluminum oxide is produced by the targeted oxidizing of steel plates with a high aluminum content (>2%, preferably >4.5%) at temperatures >900° C., preferably >1,050° C. In order to ensure that the coefficients of thermal expansion of the bipolar plates, the sealing devices and possibly the insulation plate correspond, ferritic steel types with chrome contents of approximately 20% can mainly be used (for example, the Material Numbers 1.4765 and 1.4767). More generally, ferritic steel types with a chrome content from about 15% to about 28% can be used. Since these materials can be commercially obtained as steel strips in many different thicknesses, the insulation plates, which may be used, can simultaneously have the function of a spacer between the individual bipolar plates which was taken over in the state of the art by the sealing device itself. The strips are to be machined easily in a shaping manner (stamping, punching, cutting) and, in principle, can be shaped into any form—adapted to the bipolar plate. During the joining of the fuel cell stack, they are sealed in on both sides between the bipolar plates.

In preferred embodiments of the invention, electric short and leak currents between the individual cell elements in the fuel cell stack are prevented. The application of an electrically insulating element between the bipolar plates of solid-electrolyte fuel cell stacks permits the use of sealing materials that are less than completely electrically insulating for separating and distributing the combustible and oxidation gases. The option of using these sealing devices, which are conductive at the SOFC operating temperature, permits a novel joining concept of the fuel cell stack for which a high-expenditure adaptation, which is difficult to implement, of the shrinking behavior of the sealing device and a porous electric contacting layer of the solid-electrolyte fuel cell can be eliminated. As a result, the joining process is significantly simplified.

Furthermore, the use of electrically conductive sealing materials permits the use of materials which are better adapted to the coefficients of thermal expansion of the bipolar plate materials, so that the probability of a failure of the sealing function because of faster thermal cycles is reduced, such as in the use of the solid-electrolyte fuel cell in a mobile auxiliary energy supply unit.

The use of the above-mentioned electric insulation layers will be particularly advantageous when the latter can be produced in a cost-effective manner from commercially available materials. This applies to the use of pre-oxidized ferritic steel types, but not, for example, to sintered ceramic insulation elements.

The two possible application sites of the $Al_2O_3$-insulation layer—directly onto the bipolar plate or onto additional insulation plates—each have specific advantages. The direct oxidation of the bipolar surface requires no additional components in the stack, and thus also the number of working operations during the joining of the fuel cell stack does not increase. Alternatively, when additional insulation elements are inserted, the combination of electric and mechanical tasks of the insulation elements has an advantageous effect. This combination is achieved when the insulation element simultaneously takes over the spacer function between neighboring bipolar plates from the sealing material and the sealing can thus be reduced to a minimal thickness—defined only by the sealing function.

Other objects, advantages and novel features of the present invention will become apparent from the following detailed description of the invention when considered in conjunction with the accompanying drawings.

DETAILED DESCRIPTION OF THE EMBODIMENTS

Figure 1:
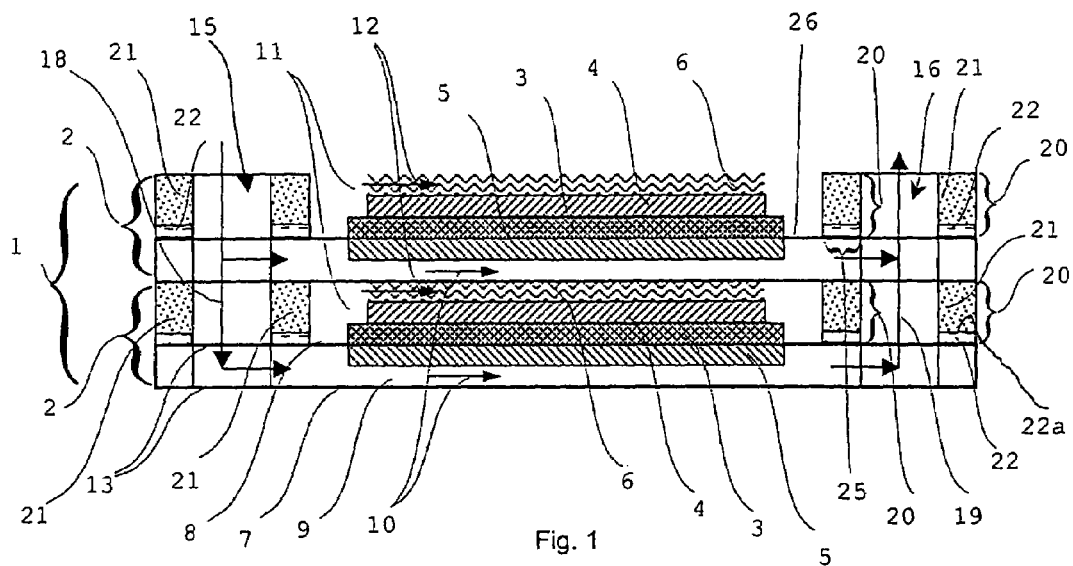
FIG. 1 is a schematic cross-sectional view of a fuel cell stack according to the invention having two individual fuel cells which have a sealing structure according to the invention.

A fuel cell stack 1 (FIG. 1) according to the invention has at least two individual fuel cells 2, preferably a plurality of individual fuel cells 2, which are stacked above one another in a tower-type manner. The individual fuel cells 2 have an electrolyte layer 3, a cathode layer 4 and an anode layer 5 and are preferably constructed as so-called solid-electrolyte fuel cells (SOFC solid-oxide fuel cells). The anode layer 5 is optionally arranged on a supporting substrate layer (not shown). The free flat side of the cathode layer 4 is connected via a contacting layer 6 with a first separator plate 7 (also called bipolar plate or interconnector plate) of a neighboring individual fuel cell 2.

The fuel cell stack 1 according to the invention has combustible gas spaces 9 through which combustible gas can flow by way of a combustible gas feeding duct 15 in the direction of the arrows 18, 10, 19. By way of a removal duct 16, excess combustible gas and reaction products can be removed. Likewise, the fuel cell stack 1 according to the invention has oxidation gas spaces 11 through which oxidation gas can flow by way of suitable feeding and removal ducts (not shown). The contacting layer 6 has an electrically conductive and porous construction so that the oxidation gas can flow through the contacting layer 6 in the direction of the arrow 12.

For separating the combustible gases from the oxidation gases, a fuel cell stack 1 according to the invention has a sealing structure 20 which has a multi-layer, particularly at least two-layer construction.

According to a first embodiment of the sealing structure 20 according to the invention, the latter has a sealing layer 21 and an insulating layer 22. The insulating layer 22 consists of a metal oxide, particularly an aluminum oxide ($Al_2O_3$) which, in a particularly preferred manner, is constructed in the so-called []-modification. $Al_2O_3$ in the []-modification has a particularly high electric resistance and an excellent corrosion stability in oxidizing as well as in reducing media.

In an embodiment corresponding to FIG. 1, the insulating layer 22 is arranged in all required sealing areas 25 between two neighboring individual fuel cells 2 on a top side 26 of one of the bipolar plates 7, 8, which top side 26 faces an oxidation space 11. The arrangement of the sealing layer 21 on a free surface of a bipolar plate 7, 8 is advantageous particularly when the bipolar plates 7, 8 are produced from a steel material with a high aluminum content (>2%). In this case, the aluminum oxide insulating layer can be produced by a targeted, particularly local oxidizing of the bipolar plates 7, 8 in the sealing areas 25, preferably above 900° C. The sealing layer 21 is arranged on a free surface 22a of the insulating layer 22, in which case it should be ensured that the sealing layer 21 is connected with no more than one of the bipolar plates 7 or 8 and, at the other end, comes in contact only with the insulating layer 22.

The sealing layer 21 is constructed, for example, of a glass-ceramic solder which, by means of additions, is adapted to the coefficients of thermal expansion of the separator plates 7, 8. Advantageously, the shrinkage behavior of the sealing layer 21 (when heated) is adapted to the shrinkage behavior of the contacting layer 6. An increased conductibility of the sealing layer 21, optionally caused by suitable additions, at the operating temperature of the fuel cells 2, particularly in the temperature range of from 750° C. to 900° C., in which solid-electrolyte fuel cells (so-called SOFC—solid-oxide fuel cells) are normally operated, is easily acceptable because of the reliable electric insulation by the insulation layer 22.

Figure 2:
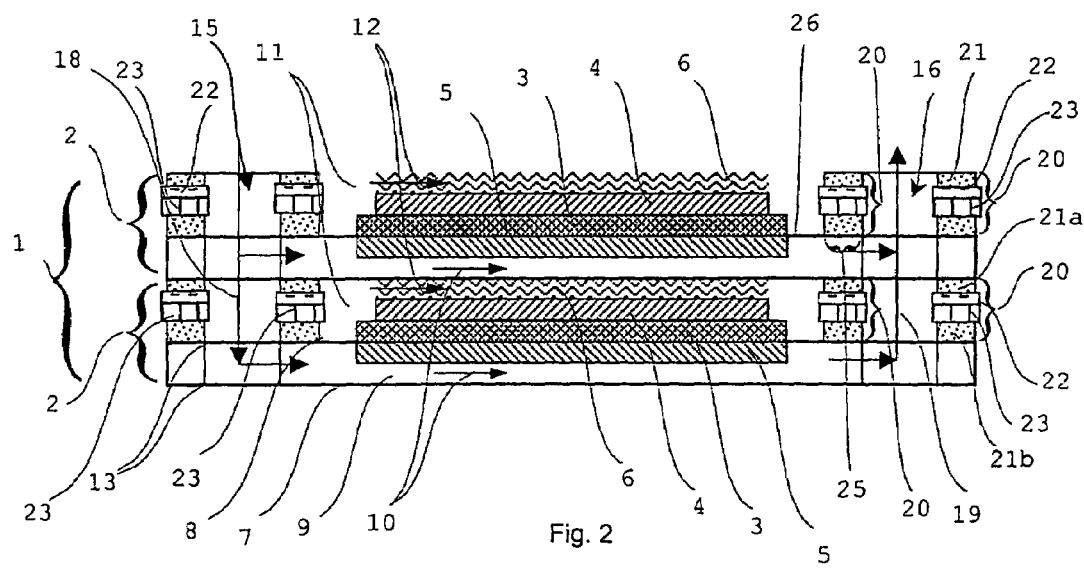
FIG. 2 is a schematic cross-sectional view of a second embodiment of a fuel cell stack according to the invention having two individual fuel cells which are equipped with a second embodiment of a sealing structure according to the invention.
Figure 3:
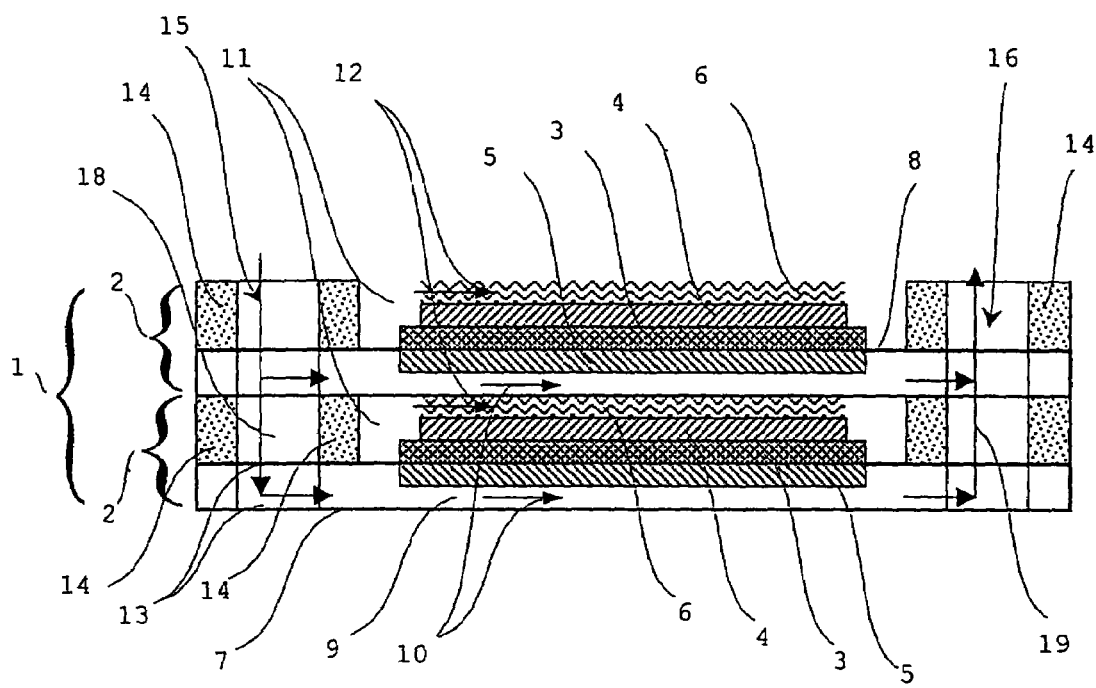
FIG. 3 is a schematic cross-sectional view of a conventional fuel cell stack.

For the gas-tight sealing-off of the feeding and removal ducts for the oxidation gas, which are not shown in FIGS. 1 and 2, a sealing structure 20 according to the invention is correspondingly arranged between a first separator plate 7 and a second separator plate 8 of an individual fuel cell 2, so that the burnable-gas spaces 9 are separated from the oxidation-gas carrying ducts.

Preferably, the insulating layer 22 covers a larger area on the separator plate 7 or 8, on which it is mounted, than is required by the sealing layer 21, so that it is ensured that no "electric bridge" can be formed by the material of the sealing layer 21 when the fuel cell stack is joined together.

In embodiments corresponding to FIG. 1, the invention provides the advantage that an improved sealing and insulating effect can be achieved between two individual fuel cells 2 without requiring additional mounting steps in comparison to previous mounting sequences during the mounting of the fuel cell stack 1. The formation of the insulating layer 22, for example, of $Al_2O_3$, can take place in a simple manner by an oxidation process during the production of the separator plates in a fully automatic fashion. Thus, a process-secure and reliable mounting of a fuel cell stack 1 corresponding to FIG. 1 of the invention is ensured.

In a second embodiment of the sealing structure of the invention corresponding to FIG. 2, the insulating layer 22 is arranged on a carrier layer 23, in which case a first sealing layer 21*a* is arranged between the insulating layer 22 and a neighboring separator plate 7, and a sealing layer 21*b* is arranged between the carrier layer 23 and its neighboring separator plate 8. Thus, in this embodiment, the sealing structure 20 has at least four layers, having at least one carrier layer 23, at least one insulating layer 22 and at least two sealing layers 21*a*, 21*b*.

In this embodiment, the insulating layer 22 is constructed of the same material as the insulating layer 22 of an embodiment corresponding to FIG. 1. The sealing layers 21*a*, 21*b* are preferably constructed of the same material as the sealing layer 21 of an embodiment corresponding to FIG. 1. The carrier layer 23 is, for example, a steel plate with a high aluminum content (>2%). In the case of such steel plates, at temperatures above 900° C., the insulating layer 22 can be produced of aluminum oxide by a targeted oxidizing.

Ferritic steel types with chrome-contents of approximately 20% (for example, Material No. 1.4765, particularly with an aluminum content of 5-6%; Material No. 1.4767, particularly with an aluminum content of 4.5-5.5%) are particularly preferred. These materials are particularly suitable for the construction of the carrier layer 23 when the uniformity or the correlation of the coefficients of thermal expansion of the bipolar plates 7, 8, the sealing devices of the sealing layer 21 and the insulation layer 22 is to be achieved. The above-mentioned materials are also particularly preferred because they are commercially available as strips in many different thicknesses and can easily be processed in a shaping manner, for example, stamped, punched and cut.

If the carrier layer 23 is constructed of a steel plate, by means of the suitable selection of the plate thickness, the carrier layer 23 can advantageously carry out an additional function, specifically the function of a spacer between two neighboring individual fuel cells 2.

Thus, in a simple manner, the shrinkage of the entire sealing structure 20 can be adapted to the shrinkage of the contacting layer 6. For example, when a sealing material for the sealing layers 21*a*, 21*b* is used which has a high shrinkage, the thickness of the carrier layer 23 can be selected to be relatively large, so that the sum of the shrinkages of the sealing layers 21*a*, 21*b* corresponds the total shrinkage of the contacting layer 6. In the case of a sealing material which has only a very slight shrinkage, by selecting a thinner carrier layer 23, the remaining sealing layer thickness of the sealing layers 21*a*, 21*b* can be selected to be so large that the sum of the shrinkages of the sealing layers 21*a*, 21*b* corresponds to the total shrinkage of the contacting layer 6.

The coordination of the individual layer thicknesses of the first sealing layer 21*a*, of the second sealing layer 21*b* and of the carrier layer 23 can be defined in a limited number of tests by a person skilled in the art in such a manner that, with respect to its shrinkage behavior, the sealing structure 20 corresponds to that of the contacting layer 6. When the shrinkage of the material, of which the contacting layer 6 consists, is particularly low, for example, also the layer thickness of the sealing layers 21*a*, 21*b* can be minimized such that the sealing-material-specific minimal thickness defined only by the sealing function is adjusted. The electric insulation capacity of the sealing device therefore no longer has to be considered when selecting the layer thickness.

The carrier layer 23 is particularly preferably constructed of a pre-oxidized ferritic steel because the operation of the oxidizing of the carrier layer 23 can therefore be eliminated during the production of the fuel cells.

The characteristics of embodiments corresponding to FIGS. 1 and 2 can also be combined. Particularly, also in the case of a sealing structure 20 corresponding to FIG. 1, an adaptation of the shrinkage characteristic can be used by inserting a carrier layer 23, which optionally has no $Al_2O_3$-layer, only for the function of a spacer.

The method according to the invention will be explained in detail in the following by means of examples.

For producing a sealing structure 20 according to the invention, an insulating layer 22 is applied to a carrier 7, 8, 23. In particularly preferred embodiments, the carrier may, on the one hand, be one of the separator plates 7, 8 and, on the other hand, the carrier layer 23.

In an embodiment, an insulating layer 22, particularly made of $Al_2O_3$, preferably $Al_2O_3$ in the γ-modification, is mounted on the carriers 7, 8, 23 in the sealing areas 25. In this case, the material of the carrier 7, 8, 23 is provided with the insulating layer 22 by targeted oxidation.

It is particularly advantageous to use a material for the carrier 7, 8, 23 which contains aluminum in a sufficiently large quantity, particularly a quantity >2%. Suitable materials are, for example, materials of the Numbers 1.4765 and 1.4767.

In this case, the targeted oxidation preferably takes place at >900° C., particularly at temperatures >1,050° C.

According to a particularly preferred embodiment, after the production of the insulating layer 22 in the sealing areas 25 of the separator plates 7, 8, the sealing layer 21, particularly in the form of a sealing material strand, is fitted onto the insulating layer 22.

If the insulating layer 22 is mounted on a carrier layer 23, particularly a carrier plate, the sealing structure is produced in that a sealing device strand for forming a first sealing layer 21*a* is applied in the sealing area 25 of the bipolar plates 7 and 8 respectively. Subsequently, the carrier layer 23 having the insulating layers 22 will be fitted onto the first sealing layer 21*a*. In this case, a sealing medium strand for forming is second sealing layer 21*b* is applied to the fitted-on carrier layer 23 again in the sealing areas 25. The above-described layer sequence is arranged between two neighboring bipolar plates 7, 8 of two neighboring individual fuel cells 2 such that either feeding and removal ducts respectively for burnable gas or feeding and removal ducts respectively for oxidation gas are constructed, the burnable gas ducts each being connected with burnable gas spaces 9, and the oxidation gas ducts being connected with oxidation gas spaces 11.

It is an advantage of the first described embodiment that, for the mounting of a fuel cell stack, in comparison to the state of the art, no additional parts exist which have to be used and thus the mounting is not made difficult, although an improved adaptation of the insulating characteristics and of the expansion or shrinkage characteristics of the sealing structure, particularly a possible adaption of the shrinkage and of the coefficient of thermal expansion of the sealing mass to the corresponding parameters of the contacting layer 6 or of the separator plates 7, 8 is achieved.

In the second embodiment of the method according to the invention, it is advantageous that, despite an additional mounting part (carrier layer 23 with the insulating layer 22), which additionally has to be inserted during the mounting of the fuel cell stack 1, it can be achieved that the carrier layer 23, together with the insulating layer 22, is incompressible and can therefore take over a spacer function. In addition, by varying the thickness ratios of the carrier layer 23 and of the sealing layers 21a, 21, the shrinkage of the sealing structure 20 can be adapted to the shrinkage of the contacting layer 6 with respect to the absolute end measurement as well as in its progress during the shrinkage. In a particularly preferred case, the thicknesses of the sealing layers 21a, 21b can be reduced so far that only the minimum thickness defined for the sealing function is present and thus a saving of the relatively expensive sealing medium used for constructing the sealing layers 21a, 21b can be achieved. It is particularly advantageous that the gap width of the sealing gap, which is to be filled with sealing material, can be reduced considerably and the risk of a failing of sealing device is therefore considerably reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sealing structure for a fuel cell or an electrolyzer, having at least first and second neighboring separator plates with a sealing structure arranged between said separator plates, wherein:
   said sealing structure comprises at least two layers, including at least one insulating layer comprising a metal oxide and at least one sealing layer; and
   the at least one insulating layer formed by preoxidation of a carrier element is arranged on the carrier element in at least one area of the carrier element having a sealing function.

2. A sealing structure according to claim 1, wherein the fuel cell or electrolyzer is one of a solid-oxide fuel cell and a solid-oxide electrolyzer.

3. A sealing structure according to claim 1, wherein the insulating layer is made of $Al_2O_3$.

4. A sealing structure according to claim 3, wherein the $Al_2O_3$ is present in the structure of the γ-modification.

5. A sealing structure according to claim 1, wherein the sealing layer comprises an inorganic material.

6. A sealing structure according to claim 5, wherein the inorganic material is a glass-ceramic solder.

7. A sealing structure according to claim 1, wherein the sealing layer has additions which ensure that the sealing layer is adapted to the thermal expansion behavior of the material of a separator plate.

8. A sealing structure according to claim 1, wherein the carrier element is a carrier layer.

9. A sealing structure according to claim 8, wherein the carrier layer is a steel plate with an aluminum content greater than 2%.

10. A sealing structure according to claim 8, wherein the carrier layer is a steel plate with an aluminum content greater than 4.5%.

11. A sealing structure according to claim 8, wherein the carrier layer is constructed of a ferritic steel with a chrome content of approximately 20%.

12. A sealing structure according to claim 8, wherein the carrier layer is constructed of a ferritic steel with a chrome content of from about 15% to about 28%.

13. A sealing structure according to claim 8, wherein the carrier layer is composed of a ferritic steel with a chrome content of approximately 20% and an aluminum content of 4.5% to 6%.

14. A sealing structure according to claim 1, wherein the carrier element is a separator plate, the insulating layer being arranged in the sealing areas.

15. A sealing structure according to claim 1, wherein the sealing structure is arranged in a fuel cell stack, the fuel cell stack being constructed of a plurality of individual fuel cells which are stacked above one another in a tower-type manner.

16. A sealing structure according to claim 15, wherein the plurality of individual fuel cells have an electrolyte layer, a cathode layer and an anode layer, the anode layer being arranged on a carrying substrate layer.

17. A sealing structure according to claim 15, wherein the insulating layer is arranged between two neighboring individual fuel cells on a top side of a separator plate, wherein the top side faces an oxidation space.

18. A sealing structure according to claim 1, wherein the insulating layer is arranged between two neighboring separator plates of an individual fuel cell in the region of the sealing areas on at least one of the separator plates.

19. A sealing structure according to claim 1, wherein the sealing layer is arranged on a free surface of the insulating layer.

20. A sealing structure according to claim 1, wherein the sealing layer is constructed of an inorganic material containing additions that is adapted to the coefficients of thermal expansion of the separator plates.

21. A sealing structure according to claim 1, wherein the insulating layer on the carrier element covers a larger surface than is required of the sealing layer.

22. A sealing structure according to claim 1, wherein a first sealing layer is arranged between the insulating layer and a neighboring separator plate, and a second sealing layer is arranged between the carrier layer and another neighboring separator plate.

23. A fuel cell or electrolyzer comprising a sealing structure according to claim 1.

24. The fuel cell or electrolyzer of claim 23, wherein the fuel cell or electrolyzer is one of a solid-oxide fuel cell and a solid-oxide electrolyzer.

25. A method of producing a sealing structure for a fuel cell or an electrolyzer, comprising:
   producing at least one insulating layer on a carrier element, wherein at least one insulating layer comprising a metal oxide is produced by oxidizing the carrier element in at least one area of the carrier element; and
   producing at least one sealing layer made of a sealing material, the sealing structure being arranged in a sealing area of a fuel cell stack.

26. A method according to claim 25, wherein the fuel cell or electrolyzer is one of a solid-oxide fuel cell and a solid-oxide electrolyzer.

27. A method according to claim 25, wherein the oxidizing takes place at a temperature above 900° C.

28. A method according to claim 25, wherein the oxidizing takes place at a temperature above 1,050° C.

29. A method according to claim 25, wherein after the production of the insulating layer, the sealing layer is fitted on in the form of a sealing material strand.

30. A method according to claim 25, wherein the sealing area is arranged between separator plates, and wherein producing at least one sealing layer made of a sealing material comprises:
- applying a sealing medium strand for forming a first sealing layer;
- fitting the carrier layer having the insulating layer onto the first sealing layer; and
- applying a sealing medium strand for forming the second sealing layer to the fitted-on carrier layer in the sealing areas.

31. A sealing structure for a fuel cell or an electrolyzer, having at least first and second neighboring separator plates with a sealing structure arranged between said separator plates, wherein:
- said sealing structure comprises at least two layers, including at least one insulating layer and at least one sealing layer and a carrier element separate from and between said separator plates;
- the insulating layer is arranged on the carrier element; and
- the carrier element is a carrier layer which is a steel plate with an aluminum content greater than 2%.

32. A sealing structure according to claim 31, wherein the fuel cell or electrolyzer is one of a solid-oxide fuel cell and a solid-oxide electrolyzer.

33. A sealing structure according to claim 31, wherein the insulating layer is a metal oxide.

34. A sealing structure according to claim 31, wherein the insulating layer is made of $Al_2O_3$.

35. A sealing structure according to claim 34, wherein the $Al_2O_3$ is present in the structure of the γ-modification.

36. A sealing structure according to claim 31, wherein the sealing layer comprises an inorganic material.

37. A sealing structure according to claim 36, wherein the inorganic material is a glass-ceramic solder.

38. A sealing structure according to claim 31, wherein the sealing layer has additions which ensure that the sealing layer is adapted to the thermal expansion behavior of the material of a separator plate.

39. A sealing structure according to claim 31, wherein the carrier layer is a steel plate with an aluminum content greater than 4.5%.

40. A sealing structure according to claim 31, wherein the carrier layer is constructed of a ferritic steel with a chrome content of approximately 20%.

41. A sealing structure according to claim 31, wherein the carrier layer is constructed of a ferritic steel with a chrome content of from about 15% to about 28%.

42. A sealing structure according to claim 31, wherein the carrier layer is composed of a ferritic steel with a chrome content of approximately 20% and an aluminum content of 4.5% to 6%.

43. A sealing structure according to claim 31, wherein one or more carrier elements are provided with an insulating layer formed by pre-oxidation in at least one sealing area.

44. A sealing structure according to claim 31, wherein the sealing structure is arranged in a fuel cell stack, the fuel cell stack being constructed of a plurality of individual fuel cells which are stacked above one another in a tower-type manner.

45. A sealing structure according to claim 44, wherein the plurality of individual fuel cells have an electrolyte layer, a cathode layer and an anode layer, the anode layer being arranged on a carrying substrate layer.

46. A sealing structure according to claim 31, wherein the sealing layer is arranged on a free surface of the insulating layer.

47. A sealing structure according to claim 31, wherein the sealing layer is constructed of an inorganic material containing additions that is adapted to the coefficients of thermal expansion of the separator plates.

48. A sealing structure according to claim 31, wherein the insulating layer on the carrier element covers a larger surface than is required of the sealing layer.

49. A sealing structure according to claim 31, wherein a first sealing layer is arranged between the insulating layer and a neighboring separator plate, and a second sealing layer is arranged between the carrier layer and another neighboring separator plate.

50. A fuel cell or electrolyzer comprising a sealing structure according to claim 31.

51. The fuel cell or electrolyzer of claim 50, wherein the fuel cell or electrolyzer is one of a solid-oxide fuel cell and a solid-oxide electrolyzer.

52. A method of producing a sealing structure for a fuel cell or an electrolyzer having at least first and second neighboring separator plates, said method comprising:
- producing at least one insulating layer on a carrier element separate from and between said separator plates; and
- producing at least one sealing layer made of a sealing material, the at least one insulating layer, the at least one sealing layer and the carrier element forming the sealing structure being arranged between said separator plates in a sealing area of a fuel cell stack,
- wherein producing the at least one sealing layer made of the sealing material comprises
  - applying a sealing medium strand for forming a first sealing layer,
  - fitting the carrier layer having the insulating layer onto the first sealing layer, and applying a sealing medium strand for forming a second sealing layer to be fitted-on carrier layer in the sealing areas.

53. A method according to claim 52, wherein the fuel cell or electrolyzer is one of a solid-oxide fuel cell and a solid-oxide electrolyzer.

54. A method according to claim 52, wherein the insulating layer is produced by oxidizing the carrier element in at least one area.

55. A method according to claim 54, wherein the oxidizing takes place at a temperature above 900° C.

56. A method according to claim 54, wherein the oxidizing takes place at a temperature above 1,050° C.

57. A method according to claim 52, wherein after the production of the insulating layer, the sealing layer is fitted on in the form of a sealing material strand.

* * * * *